(12) United States Patent
Wojak

(10) Patent No.: US 10,066,834 B2
(45) Date of Patent: Sep. 4, 2018

(54) SULPHUR-ASSISTED CARBON CAPTURE AND STORAGE (CCS) PROCESSES AND SYSTEMS

(71) Applicant: Bogdan Wojak, Vancouver (CA)

(72) Inventor: Bogdan Wojak, Vancouver (CA)

(*) Notice: Subject to any disclaimer, the term of this patent is extended or adjusted under 35 U.S.C. 154(b) by 0 days.

(21) Appl. No.: 14/762,846

(22) PCT Filed: Apr. 15, 2013

(86) PCT No.: PCT/CA2013/000356
§ 371 (c)(1),
(2) Date: Jul. 23, 2015

(87) PCT Pub. No.: WO2014/117243
PCT Pub. Date: Aug. 7, 2014

(65) Prior Publication Data
US 2015/0362188 A1    Dec. 17, 2015

Related U.S. Application Data

(60) Provisional application No. 61/758,732, filed on Jan. 30, 2013.

(51) Int. Cl.
| | | |
|---|---|---|
| *B01D 53/62* | (2006.01) | |
| *B01D 53/75* | (2006.01) | |
| *B01D 53/34* | (2006.01) | |
| *B01D 53/86* | (2006.01) | |
| *F23L 7/00* | (2006.01) | |

(Continued)

(52) U.S. Cl.
CPC .............. *F23J 15/02* (2013.01); *B01D 53/62* (2013.01); *B01D 53/75* (2013.01); *C04B 7/367* (2013.01); *F23L 7/007* (2013.01); *B01D 2251/508* (2013.01); *Y02C 10/04* (2013.01);
(Continued)

(58) Field of Classification Search
None
See application file for complete search history.

(56) References Cited

U.S. PATENT DOCUMENTS

| | | |
|---|---|---|
| 1,783,901 A | 12/1930 | Bottoms |
| 2,468,904 A | 5/1949 | Wagner |

(Continued)

FOREIGN PATENT DOCUMENTS

| | | |
|---|---|---|
| CA | 780780 | 3/1968 |
| CA | 930930 | 7/1973 |

(Continued)

OTHER PUBLICATIONS

DE102004013283 English Language Abstract (1 page).
(Continued)

*Primary Examiner* — Daniel Berns
(74) *Attorney, Agent, or Firm* — Ware, Fressola, Maguire & Barber LLP

(57) ABSTRACT

A system for carbon capture includes an oxy-fuel combustor for combusting a hydrocarbon with pure oxygen to produce heat energy and carbon dioxide, a COS converter for converting the carbon dioxide to COS, a transport means for transporting the COS, a sulphur recovery unit for recovering sulphur from the COS and an adjunct sulphur-burning power plant for combusting the sulphur to generate energy for powering one or more carbon capture and storage processes.

9 Claims, 5 Drawing Sheets

(51) Int. Cl.
*C04B 7/36* (2006.01)
*F23J 15/02* (2006.01)

(52) U.S. Cl.
CPC ........... *Y02E 20/326* (2013.01); *Y02E 20/344* (2013.01); *Y02P 40/18* (2015.11)

(56) References Cited

U.S. PATENT DOCUMENTS

| | | | |
|---|---|---|---|
| 2,709,639 | A | 5/1955 | Folkins et al. |
| 2,857,250 | A | 10/1958 | Timmerman et al. |
| 3,087,788 | A | 4/1963 | Porter |
| 3,409,399 | A | 11/1968 | Bertozzi et al. |
| 3,432,266 | A | 3/1969 | Garlet et al. |
| 3,803,298 | A | 4/1974 | Guth et al. |
| 4,107,557 | A | 8/1978 | Shepherd |
| 4,120,944 | A | 10/1978 | Kubicek |
| 4,354,354 | A | 10/1982 | Wysk et al. |
| 4,396,594 | A | 8/1983 | Kohl |
| 5,086,234 | A | 2/1992 | Shiota et al. |
| 5,204,082 | A | 4/1993 | Schendel |
| 7,052,670 | B2 | 5/2006 | Labraña Valdivia et al. |
| 7,543,438 | B2 | 6/2009 | Wojak |
| 7,631,499 | B2 | 12/2009 | Bland |
| 2009/0235669 | A1 | 9/2009 | Wojak |
| 2010/0230296 | A1 | 9/2010 | Northrop |
| 2010/0242478 | A1 | 9/2010 | Wojak |
| 2011/0146978 | A1 | 6/2011 | Perlman |
| 2012/0027655 | A1 | 2/2012 | Schaffer et al. |
| 2013/0055936 | A1* | 3/2013 | Vimalchand ........... B01J 8/0055 110/245 |

FOREIGN PATENT DOCUMENTS

| | | |
|---|---|---|
| CA | 978721 | 12/1975 |
| CA | 2700746 | 1/2013 |
| DE | 102004013283 | 10/2005 |
| EP | 1956293 | 8/2008 |
| EP | 2042470 | 4/2009 |
| HU | 185221 | 10/1987 |
| HU | 202452 | 3/1991 |
| JP | 201272012 | 4/2012 |
| WO | 2009039611 | 4/2009 |

OTHER PUBLICATIONS

HU202452 English Language Abstract (1 page).
HU185221 English Language Abstract (2 pages).
Ung Lee, Youngsub Lim, Sangho Lee, Jaeheum Jung, "$CO_2$ Storage Terminal for Ship Transportation," Ind. Eng. Chem. Res. 2012,51,389-397).
Masatoshi Sugioka, Atsushi Ikeda and Kazuo Aomura, "A Study for Effective Utilization of Carbon Dioxide—The Synthesis of Carbonyl Sulfide and Carbon Monoxide by the Reaction of Carbon Dioxide and Carbon Disulfide," Bulletin of the Faculty of Engineering, Hokkaido University, 93:35-42, Jan. 31, 1979.
Michael Bernstein, "A Milestone for New Carbon-dioxide Capture/clean Coal Technology," public release date Mar. 20, 2013, American Chemical Society (2 pages).
Sadallah Al Fathi, Special to Gulf News, Carbon Capture and Storage: The Devil Lies in the Details, Published 12:39 Jan. 27, 2013 (2 pages).
Li, F., Kim, H., Sridhar, D., Zeng, L., Wang, F., Tong, A., & Fan, L. S. (May 2009). Coal direct chemical looping (CDCL) process for hydrogen and power generation. In Proceedings of the 34th International Technical Conference on Coal Utilization & Fuel Systems. (10 pages).
Recommended Practice Det Norske Veritas As, "Geological Storage of Carbon Dioxide" (Apr. 2012) The electronic pdf version of this document found through http://www.dnv.com is the officially binding version DNV-RP-J203 (pp. 1-56).
Recommended Practice Det Norske Veritas, Qualification Procedures for C0 Capture Technology (Apr. 2010) DNV-RP-J201 (pp. 1-34).
Recommended Practice Det Norske Veritas, Design and Operation of $CO_2$ Pipelines (Apr. 2010) DNV-RP-J202 (pp. 1-41).
JP201272012 English Language Abstract (1page).

* cited by examiner

Prior Art

Post-combustion

Oxyfuel combustion

Pre-combustion

SULPHUR-ASSISTED CARBON CAPTURE AND STORAGE (CCS) PROCESSES AND SYSTEMS

TECHNICAL FIELD

The present invention relates generally to carbon capture and storage (CCS) and, in particular, to sulphur-assisted carbon capture and storage processes and systems.

BACKGROUND

Over the last decade, substantial resources have been directed towards developing cost-efficient processes of capturing carbon dioxide ($CO_2$) from large point sources, such as fossil fuel power plants, cement factories, oil refineries, or iron and steel mills, and injecting and isolating the captured $CO_2$ in deep geological formations.

Carbon Capture and Storage (CGS) consists of three major steps: $CO_2$ capture from the energy conversion process; $CO_2$ transport; and $CO_2$ storage. For each step there are currently several technology options, with different levels of performance and maturity, so numerous constellations for CCS can be envisaged although many technological hurdles remain to be overcome before commercialization is feasible.

Carbon Capture

The problems of carbon capture from fossil fuel power plants are: the low pressure and dilute concentration dictate a high actual volume of gas to be treated; trace impurities in the flue gas tend to reduce the effectiveness of the $CO_2$ adsorbing processes; compressing captured $CO_2$ from atmospheric pressure to typical pipeline pressure (102 to 136 atm or 1,500 to 2,000 psi) in which $CO_2$ can be transported more economically and efficiently, represents a large parasitic load.

In broad terms, there are three $CO_2$ capture methods that are generally indistinguishable in cost and efficiency: post-combustion capture that separate $CO_2$ from flue gases produced by combustion of a primary fuel (coal, natural gas, oil or biomass) in air, pre-combustion capture that process the primary fuel in reactor to produce separate streams of $CO_2$ for storage and $H_2$ which is used as a fuel, and oxyfuel combustion that uses oxygen instead of air for combustion, producing a flue gas that is mainly $H_2O$ and $CO_2$ and which is readily captured. These three prior-art methods are illustrated schematically in FIG. 1.

The capture of $CO_2$ is not necessarily limited to the above mentioned techniques and it may be possible to pick and choose among the elements of the main $CO_2$ capture systems and develop hybrid systems which are possibly cheaper and more energy efficient. To date, the proposed hybrid carbon capture systems comprise: post combustion capture with oxygen enriched combustion; regenerable sorbents (calcium looping) with oxyfuel combustion; post combustion capture in IGCC plants; gasification with oxyfuel; and gasification with chemical looping.

However, the proposed hybrid carbon capture systems have not been physically studied or tested with one exception: the use of oxyfuel combustion for the calcination step in carbonate looping capture. The existence of hybrid capture concepts means that capture systems may not have to be limited to the three "conventional" techniques outlined above.

Four different $CO_2$ separation techniques are used in $CO_2$ capture processes. These are 1) absorption, 2) adsorption, 3) membrane separation, and cryogenic processes. Absorption processes for $CO_2$ separation can be divided into two categories: (a) chemical absorption where the solvent (usually alkanolamines) chemically reacts with $CO_2$ and (b) physical absorption where the solvent only interacts physically with $CO_2$ (such as glycol ethers in the Selexol Process).

One of the methods proposed for $CO_2$ concentrating is by absorption and stripping with aqueous amine. The basic process of $CO_2$ scrubbing by amine was patented in 1930 (U.S. Pat. No. 1,783,901). Amine scrubbing is a well-understood and widely used technology. Aqueous amine sorbents have been successfully used to clean carbon dioxide and hydrogen sulphide from natural gas and industrial waste streams. Extending it to a flue gas process, a solvent absorbs $CO_2$ from flue gas and is regenerated by heating for several hours in recovery columns at 150° C. This technology can be applied to already existing plants; components in the non-integrated equipment can be replaced, developed, and upgraded without fundamental impact on the power plant.

However, there are some major disadvantages. The equipment will be very large, comparable with the footprint size of a coal-fired power plant and this is a significant challenge when dealing with existing plants that have fixed layouts and limited open space. Furthermore, large volumes of solvent and water are needed; heating to regenerate the solvent reduces efficiency and can produce toxic byproducts, emissions of solvents from recovery columns have to be scrubbed and eliminated, and the solvent that is degraded by flue-gas impurities needs to be disposed. Furthermore, the cost of amine scrubbing to capture carbon dioxide, then compressing it to pipeline pressure, is prohibitively expensive.

Another method proposed for $CO_2$ concentrating is by oxy-fuel combustion in which the fuel is burned with a mixture of recirculated flue gas and oxygen instead of air. The absence of nitrogen (by excluding air) produces a flue gas stream with a high concentration of $CO_2$, and therefore facilitates capture. Oxy-fuel combustion is being developed for both turbine power cycles and for pulverized coal plants. Oxy-fuel combustion can be performed using conventional atmospheric oxy-fuel combustion power cycles or pressurized oxy-fuel combustion systems that have the potential for even better performance.

The main problem with known oxy-fuel methods is the parasitic power demand for separating oxygen from the air. This is usually completed cryogenically. For a typical 500 MW coal-fired power station, supplying pure oxygen requires at least 15% of the electricity the plant generates.

The technical risks associated with oxy-fuel are potentially less than other clean coal technologies because the technology is less complex and can be retrofitted to old or new coal-fired plants with significant reductions in the capital and operating cost of flue gas cleaning equipment such as de-NOx plant.

$CO_2$ Transport

Carbon dioxide is already transported for commercial purposes by road (tanker truck), by ship and by pipeline. Large networks of $CO_2$ pipelines, mainly associated with $CO_2$ flooding of oil reservoirs for Enhanced Oil Recovery (EOR), have been in use since the early 1980s and are operated commercially with proven safety and reliability records. Most of them lie in the US, where more than 4 000 km of pipelines already exist, with the Permian Basin containing between half and two-thirds of the active $CO_2$ floods in the world.

Movement of $CO_2$ is best accomplished under high pressure. When pressure reaches 81 atm, $CO_2$ enters what is called the supercritical phase (also referred to as a dense vapour phase). Pipeline transportation of $CO_2$ in the supercritical phase is more desirable than transportation in the gaseous phase. As a dense vapour in the supercritical state, $CO_2$ can be transported more economically and efficiently using smaller pipelines and pumps because greater volumes of fluid can be transported as a dense vapour than as a gas. In addition, $CO_2$ would be difficult to transport as a gas because it would enter into two-phase flow at a lower pressure than that required for the efficient pipeline transportation of the $CO_2$.

Carbon storage fields will be needed in many different regions which may be far from the capture sites. Transportation by ship may thus be required for transportation of carbon dioxide over these longer distances. For transportation by ship, the gas is compressed at a pressure of 6-7 bar and cooled down to near −52° C. The liquid $CO_2$ resulting from the liquefaction process is subsequently sent to a $CO_2$ intermediate storage terminal that serves as a port for $CO_2$ carriers and storage tanks. The principal basis for the storage terminal design is that the $CO_2$ stream should be kept in a liquid phase for the entire process. Cryogenic liquids such as liquid $CO_2$ rapidly expand on evaporation; when $CO_2$ expands at 220 K, the fully vaporized $CO_2$ occupies approximately 80 times the volume of liquid $CO_2$. This volume change can occur almost instantaneously, and such an expansion can result in serious damage to the storage system causing, for example, pipeline fractures and tank explosions. The BOG (Boil Off Gas) re-liquefaction system and pipe and tank insulation system could require a large amount of energy depending upon the operating process (see also Ung Lee, Youngsub Lim, Sangho Lee, Jaeheum Jung, $CO_2$ Storage Terminal for Ship Transportation, Ind. Eng. Chem. Res. 2012, 51, 389-397).

$CO_2$ Storage $CO_2$ storage may involve the injection of $CO_2$ into hydrocarbon fields or the use of carbon dioxide for a process like enhanced oil recovery (EOR). EOR involves the injection of $CO_2$ into a hydrocarbon formation and the extraction of the fluid (mixture of water, $CO_2$ and oil) where $CO_2$ usually is re-injected. The sequestration of $CO_2$ into saline aquifers on land is different from EOR, as it compresses or displaces the existing pore fluid by raising the pressure without extraction of the saline water. The pore fluids frequently contain high concentrations of toxic metal such as arsenic or lead. Displacing such pore fluid from the formation, similar to producing oil during EOR, and then discharging it, would be trading one disposal problem for another. If the permeability of the reservoir is high the management of pressure is not a problem because the pressure is rapidly dispersed. With a large $CO_2$ volume injected within one formation, displacements of saline water and pressure management may prove the greatest challenge for CCS storage.

Since 1996 StatoilHydro has been injecting 1 million metric tons of $CO_2$ per year into a sandstone reservoir—a thick sequence of impermeable shale—that lies 1000 m below the sea surface. The $CO_2$ injection offshore into marine sediment is not direct ocean storage as the $CO_2$ is stored deep beneath the ocean avoiding effects on ocean ecology. The pore fluid in most marine sediment is similar to seawater. As long as there not a high concentration of oil or other hydrocarbons, the release of marine pore fluid to seawater to accommodate $CO_2$ injection will not cause any harm to the marine environment. The ability to manage pressure by drilling additional wells to release pore fluid to the ocean not only provides extra safety to prevent a fracture from allowing $CO_2$ to escape to the surface, but also allows a much higher fraction of the pore space to be used, reducing the footprint of an individual injection field. Marine sediments offer enormous storage potential because reservoirs with adequate permeability in deep water (below 3000 m) are under high pressure and low temperature which would render the $CO_2$ denser than seawater, making the thick, low-permeability cap rock required on land storage to prevent $CO_2$ from escaping less imperative.

Although offshore $CO_2$ storage is much more expensive than for comparable storage on land, it is easier to permit offshore storage than it is to store carbon dioxide in the heavily populated areas of the US or Europe where most $CO_2$ is created but where locating storage sites may be practically impossible because of public opposition and lack of local political support. On the other hand, beyond 3 miles (5 km) offshore, the surface landowner is the national government. The regulations for CCS focus on the contamination of drinking water aquifers, which is not an issue for marine sediments far offshore. Offshore storage also offers a similar advantage in locating pipelines for $CO_2$ transport, which are difficult to site in heavily settled urban areas.

From the foregoing, it is apparent that there are a number of significant obstacles to the implementation of carbon capture and storage technologies. Therefore, more efficient and cost-effective COS technologies that overcome some of these impediments are highly desirable.

SUMMARY

The capture, transport, and storage of $CO_2$ require energy which reduces the overall efficiency of power generation or other processes, leading to increased fuel requirements, solid waste and environmental impacts relative to the same type of base plant without capture. Therefore, the present invention provides a comprehensive solution to overcome the barriers that currently prevent implementation of CCS processes. This novel COS process uses or incorporates sulphur combustion technologies that provide supplementary energy for the COS processes.

In broad terms the method depicted in FIG. 2 is based on an innovative use of sulphur and its compounds according to the following equations:

$$CO_2 \text{ Conversion: } CO_2 + CS_2 \rightarrow 2COS \qquad (1)$$

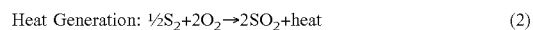

$$\text{Heat Generation: } \tfrac{1}{2}S_2 + 2O_2 \rightarrow 2SO_2 + \text{heat} \qquad (2)$$

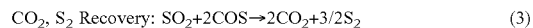

$$CO_2, S_2 \text{ Recovery: } SO_2 + 2COS \rightarrow 2CO_2 + 3/2 S_2 \qquad (3)$$

To summarize, as best shown in FIG. 2, a system for carbon capture and storage includes an oxy-fuel combustor for combusting a hydrocarbon (e.g. coal) with pure oxygen to produce heat energy and carbon dioxide. The carbon dioxide, in another embodiment, may come from a Coal Direct Chemical Looping (CDCL) process or any other source of concentrated $CO_2$ gas. The system includes a COS converter for converting the carbon dioxide to COS and a transport means (e.g. a pipeline, duct, tanker car, train, truck, ship, barge, etc.) for transporting the COS to a recovery site. Also, the system includes a sulphur and carbon dioxide recovery unit and adjunct sulphur-fuelled power plant to provide supplementary energy for oxygen generation and other energy required by CCS processes.

Furthermore, the supplementary energy provides opportunity of electrolytic oxygen production economical significantly enhanced by coproduced hydrogen which can be use as a clean fuel for generation even more energy.

The sulphur combustion-power generation plant can be envisioned in many configurations as conventional steam turbine/generator or as a gas turbine topping or as magneto-hydrodynamic (MHD) power generation combined systems.

The other benefit is that the location of the adjunct power plant may be at or near the $CO_2$ storage site instead within existing plants that often have fixed layouts and limited open space. Furthermore, it could be one adjunct power plant at the storage site for plural COS sources.

The sulphur for the sulphur combustion is obtained by converting the rich stream of carbon dioxide from any industrial sources, and particularly that is produced by the oxy-fuel combustion or coal chemical looping, into COS, transporting the COS to a recovery site and then recovering the sulphur from the COS.

In one main embodiment, the solvent used for carbon dioxide conversion is carbon disulphide ($CS_2$) which was never used before in the context of $CO_2$ capture.

It is important to note that the flammability limits or explosive ranges of carbon disulphide deserve special attention but the flammability limit can be significantly decreased or even it rendered non-flammable in carbon dioxide or nitrogen atmosphere.

For making carbon disulphide there is considerable data available in the literature. It can be produced by a variety of reactions but the route using methane from natural gas as the source of carbon is the predominant process worldwide. Using methane and sulphur provides high capacity in an economical, continuous unit.

Moreover, in the embodiment depicted in FIG. 3, the methane used as a source of carbon is compensated or offset by the hydrogen produced through electrolysis. In addition, the hydrogen sulphide by-product from the process is treated in an oxygen-fired Claus sulphur recovery unit which provides the heat for the process. Therefore, no additional fuel is required.

By converting the carbon dioxide to COS, the $CO_2$ can be transported as liquid COS efficiently from a generation site (e.g. oxy-fuel power plant) by pipeline, train, truck or ship to the adjunct power plant at a remote location for subsequent recovery of elemental sulphur from the COS, generation of energy, and sequestration of carbon dioxide obtained from the recovery of elemental sulphur from the COS.

It should be especially appreciated that the density of COS is much higher than that of $CO_2$ gas. For example, at 10° C. and 9 bar, COS is a liquid with a density of 1 gm/cc and contains 0.2 gm carbon per cc, forty times more than $CO_2$ which at the same temperature and pressure would be a vapour with a density of 0.018 gm/cc or 0.005 gm carbon per cc. Furthermore, the COS is compatible with many metals such as aluminum, copper, Monel® nickel-copper alloy, carbon steel, 300-series stainless steels, and brass. However, the compatibility is considerably reduced in the presence of moisture, as is commonly observed with many acid gases.

Many other applications for this invention can be envisioned. For example, the simultaneous transport of sulphur and carbon dioxide shown in FIG. 5 may provide a significant advantage in that sulphur may then be recovered along with $CO_2$ at locations with existing infrastructural capabilities that would resolve logistical problems associated with sulphur delivery for export. This will ensure stable supply conditions for sulphur from a given region, e.g. western Canada, greatly enhancing the suppliers' ability to respond to periods of increased sulphur demand in the global marketplace.

The thermal energy generated this way can be also used for powering ship steam engines, thus saving on fuel costs (FIG. 6). The thermal energy generated by sulphur combustion can be converted to mechanical energy (gas and/or steam turbine) and the product of the sulphur combustion reduced by transported COS to $CO_2$ and sulphur. This would enable many scenarios which were hitherto not possible or economically feasible. For example, Poland, which is a large producer of sulphur, could supply sulphur to Morocco which is large importer, by sending the sulphur via ship in the form of COS. Sulphur could then be recovered according to the above-described method resulting in thermal energy generation and $CO_2$ being sequestered in saline formations in the Sahara. The benefit for Poland would be a credit for the $CO_2$ emission reduction. For Morocco, it would receive sulphur for sulphuric acid production which is what Morocco needs for manufacturing phosphate fertilizer.

In another example scenario, Canada could transport sulphur and $CO_2$ from its oil sands by pipeline and/or ship, again in the form of COS, to India. The benefit for Canada would be a credit for the $CO_2$ emission reduction. In return, India would receive needed sulphur and will be able to generate electric power by burning the recovered sulphur. A similar scenario may be envisioned with regard to the transport of sulphur from US Gulf refineries to Florida. Florida needs energy for its growing population and also is importing large volumes of sulphur used by its phosphate industries. The carbon dioxide can be sequestered in a saline formation at the site, similar to the ongoing $CO_2$ sequestration project at the 250-megawatt gasification unit at Tampa Electric Polk Power Station.

Another example application of this novel CCS technology is at petroleum refineries. Sulphur in petroleum fractions is most frequently found in the form of thiols, sulphides, disulphides, polysulfides and cyclic-thiophenes. Thiols and disulphides are unstable and tend to decompose easily to $H_2S$ and unsaturated compounds. Thiols can be easily reduced by hydrogen to $H_2S$ and hydrocarbons. The thermodynamics of some of the reactions of the organic sulphur compounds in the gas phase shows that above 600 K organosulphur compounds tend to decompose to the reactive form of sulphur ($S_2$), hydrogen, and carbon. At the same time, formation of $H_2S$ from $H_2$ and $S_2$ is favourable. Formation of $CS_2$ from C and $S_2$ becomes favourable above about 800 K.

Currently, virtually all of the petroleum refineries worldwide have one or more hydrodesulphurization (HDS) units. Using ethanethiol ($C_2H_5SH$), a sulphur compound present in some petroleum products, as an example, the hydrodesulphurization reaction can be simply expressed as Ethanethiol+Hydrogen→Ethane+Hydrogen Sulphide $$C_2H_5SH + H_2 \rightarrow C_2H_6 + H_2S \tag{5}$$

In an industrial hydrodesulphurization unit, such as in a refinery, the hydrodesulphurization reaction takes place in a fixed-bed reactor at elevated temperatures ranging from 300 to 400° C. and elevated pressures ranging from 30 to 130 atmospheres of absolute pressure, typically in the presence of a catalyst consisting of an alumina base.

So, it is feasible to replace the hydrogen in reaction (5) by carbon that can be simply depicted as Ethanethiol+Carbon→Ethane+Carbon Disulphide $$2C_2H_5SH + C \rightarrow 2C_2H_6 + CS_2 \tag{6}$$

Subsequently, the CS$_2$ converted to COS by the stream of CO$_2$ from various refineries processes.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
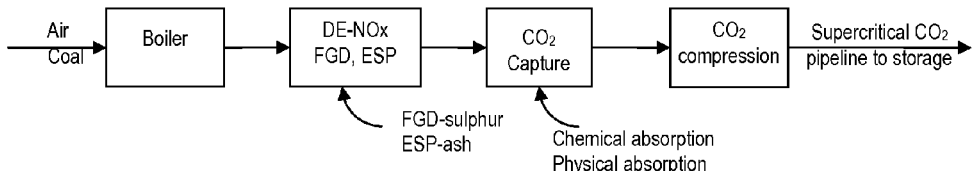
FIG. 1 schematically depict the three prior-art methods of carbon capture.
Figure 1:
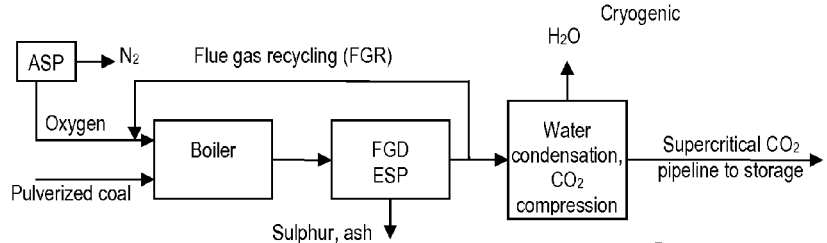
Figure 1:
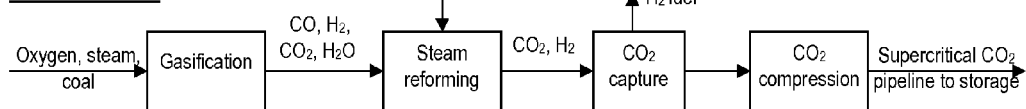
Figure 2:
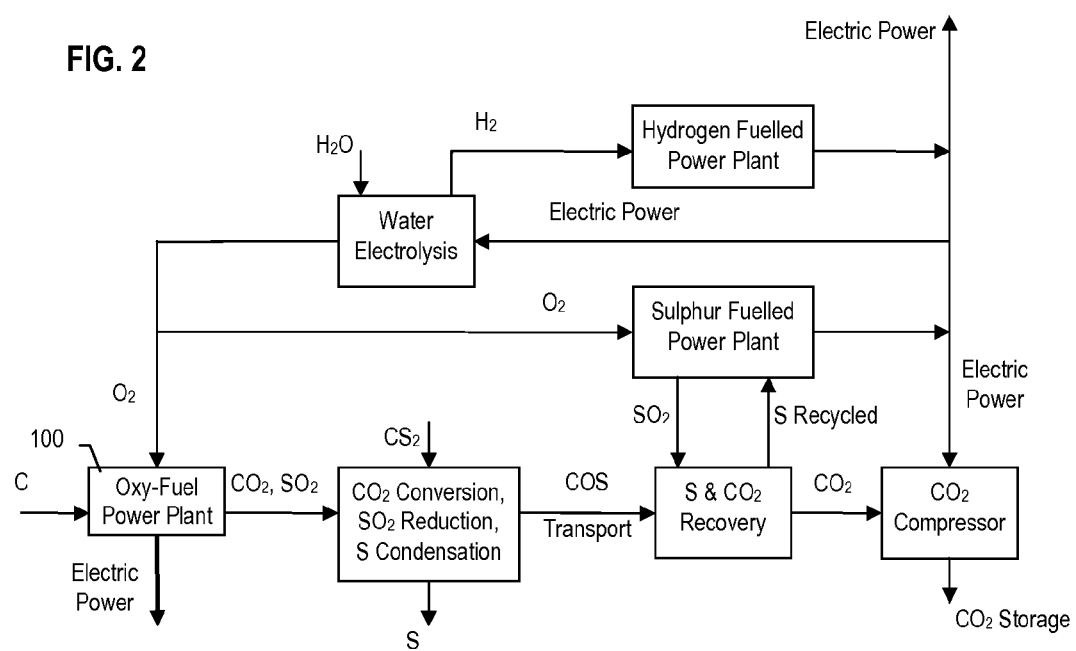
FIG. 2 schematically depicts a carbon capture oxy-fueled system integrated with an adjunct sulphur-fueled power generation plant in accordance with one embodiment of the present invention.
Figure 3:
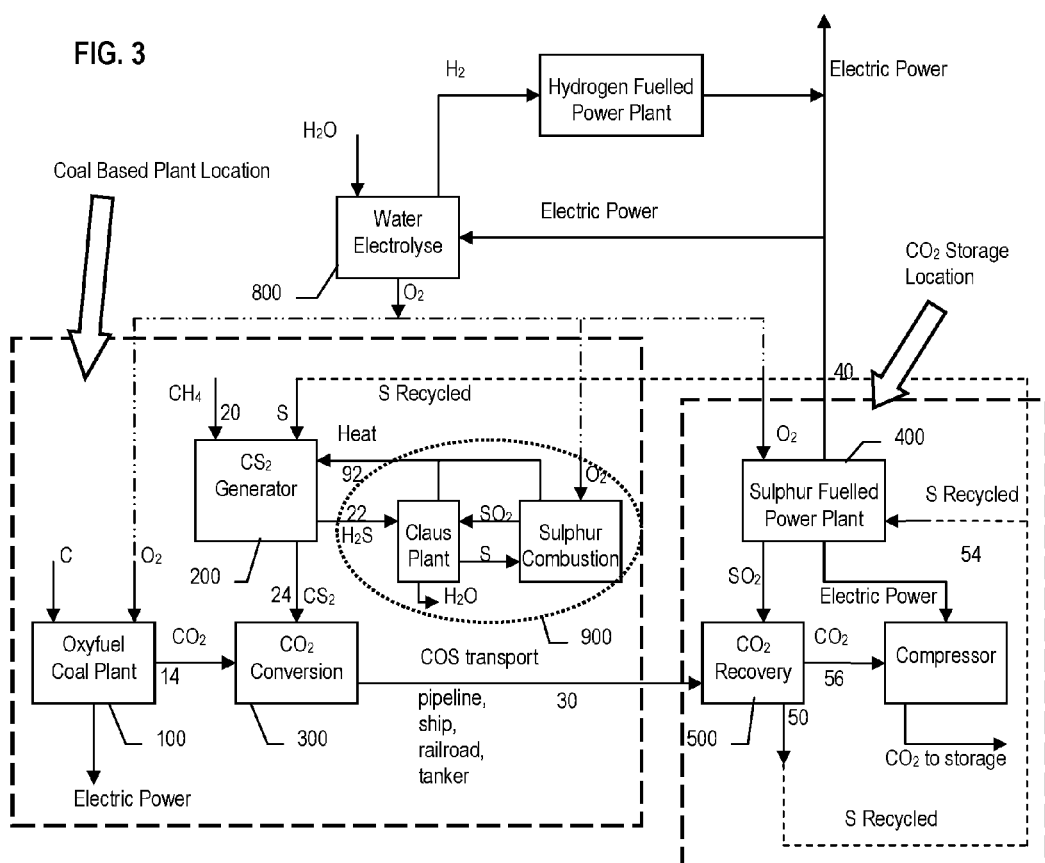
FIG. 3 schematically depicts a carbon capture oxy-fueled system integrated with a "methane-sulphur" CS$_2$ generation plant and an adjunct sulphur-fueled power generation plant in accordance with another embodiment of the present invention.

As illustrated in the embodiment represented by FIG. 3, the concentrated stream of CO$_2$ 14 produced by the combustion of a hydrocarbon such as coal by the oxy-fuel system 100 is converted to carbonyl sulphide (COS) 30 by reaction with carbon disulphide 24 in a reactor 300 as reaction (1), and is used in a reactor 500 as a reducing agent of sulphur dioxide (SO$_2$) 40, the product of sulphur fueled "adjunct" power generation plant 400, reaction (2) to sulphur 50, and carbon dioxide 56, reaction (3). The oxygen required for this system is provided by a water electrolysis unit 800.

CO$_2$ Conversion: CO$_2$+CS$_2$→2COS     (1)

Adjunct Power Plant: ½S$_2$+O$_2$→SO$_2$+heat     (2)

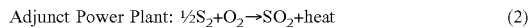

CO$_2$, S$_2$ Recovery: SO$_2$+2COS→2CO$_2$+3/2S$_2$     (3)

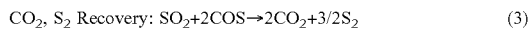

There are patents and scientific literature describing COS synthesis by a catalytic reaction between CO$_2$ and CS$_2$. For example, Rosen et. al. in Canadian Patent No. 780780 which is hereby entirely incorporated by reference, disclosed a process for producing carbonyl sulphide in a yield of about 90% or more by the reaction of carbon dioxide and carbon disulfide (2) if the reaction is conducted at moderately elevated temperatures in the range of 100 to 600° C. and in the presence of high surface area catalysts such as activated silica gel, activated zeolites, activated alumina and activated charcoal.

Furthermore, 100% CS$_2$ conversion to COS at 300° C. in the reaction of carbon dioxide and carbon disulfide over various metal oxide catalysts such Al$_2$O$_3$, ZrO$_2$, ThO$_2$ is reported by Masatoshi Sugioka, Atsushi Ikeda and Kazuo Aomura, A Study for Effective Utilization of Carbon Dioxide—The Synthesis of Carbonyl Sulfide and Carbon Monoxide by the Reaction of Carbon Dioxide and Carbon Disulfide, Bulletin of the Faculty of Engineering, Hokkaido University, 93:35-42, Jan. 31, 1979.

Nemeth et. al., in Hungarian Patent No. 185 221 discloses a process for producing carbonyl sulphide of high purity by reaction (1) in continuous running.

Furthermore, Nemeth et. al., in Hungarian Patent No. 202 452 discloses a process for the production of carbonyl sulphide from carbon dioxide and carbon disulphide in the presence of a catalyst. In this process, carbon dioxide and carbon disulphide react in the presence of a 98% pure gamma-aluminium oxide catalyst. The catalyst contains 1% silicon dioxide and traces of sodium oxide, sulphate ions, iron and other metals.

Carbon disulphide is a common industrial solvent in a wide variety of applications. It is used for dissolving residues from oil well casings and pipelines, for unplugging sour gas wells obstructed by elemental sulphur, as a solvent in emulsion polymerization and the production of nitrocellulose and polyvinyl, as well as many other uses. Some rayon manufacturers produce their own carbon disulfide. Modern plants generally produce carbon disulfide of about 99.99% purity although never before in the context of CO$_2$ capture.

The formation of carbon disulfide 24 in reactor 200 in this embodiment uses methane from natural gas as the source of carbon 20 and sulphur 54. The process can be represented by equation (4):

CH$_4$+2S$_2$→CS$_2$+2H$_2$S     (4)

Thermodynamically, the reaction is very favorable for carbon disulphide formation, and with the methane-sulphur system, carbon disulphide of over 90-mole percent per pass can be realized. For equation (4), starting with methane and solid sulphur at 25° C., and ending with gaseous products at 600° C., the reaction is endothermic. However, the reaction of methane and sulphur vapour in the diatomic form is actually exothermic and superheating of the sulphur offers a means of reducing process temperatures at which the sulphur dissociates.

Guennadi in German Patent DE102004013283 provides a method for producing carbon disulphide without fuel use. This German patent discloses the combined production of carbon disulphide and sulphuric acid. In the proposed technology, instead of the natural gas fuel, sulphur combustion products are the main heat transfer medium. The thermal energy is formed by the oxidation of sulphur to sulphur dioxide. In the embodiment depicted in FIG. 3, the required heat 92 for the superheating of the sulphur is provided by the Claus Plant 900 where the sulphur is recovered from hydrogen sulphide 22 formed from the methane-sulphur process.

The sulphur recovery plant 900 includes the Claus Plant with a sulphur dioxide generator that employs the sulphur submerged combustion method (also referred to herein as a "bubbling chamber", "sulphur vaporizer", or "sulphur evaporator"), whose function was described in greater detail in CA 2,700,746, US 2009235669 and U.S. Pat. No. 7,543, 438, which are hereby incorporated by reference.

The submerged sulphur combustion method has been commercially used for sulphur dioxide production since 1989 by Calabrian Corporation. This method has been modified and applied to fit the unique requirements of an oxygen-fired Claus plant by Brown & Root Braun ("No-TICE" process) (U.S. Pat. No. 5,204,082).

In the process of sulphur combustion in oxygen at the sulphur-fuelled power plant 400, it is important to ensure complete combustion of sulphur and to control the temperature. In the stoichiometric combustion of sulphur with oxygen, the calculated temperature when the reactants ($SO_2$, SO, $S_2$, S and $O_2$) are in equilibrium, taking into account the dissociation process, is about 3000° C. The temperature exceeding 5000° C. occurs in the stoichiometric combustion of diatomic sulphur ($S_2$) in oxygen. The temperature can be reduced to a permissible level, which depends on the nature of the materials used, by adopting one or more of the following measures or techniques disclosed by the following patents:

U.S. Pat. No. 7,052,670 discloses a method in which the temperature of the combustion of sulphur and oxygen is controlled by means of pre-defined S, $O_2$, and $SO_2$ ratios.

Canadian Patents No. 930930 and 978721, and U.S. Pat. No. 3,803,298 provide a method of combustion of sulphur with oxygen in interstages.

Furthermore, Applicant's Canadian Patent No. 2,700,746, and US Patent Application Publication No. 2010/0242478 as well as U.S. Provisional Patent Applications 61/704,834 and 61/715,425 disclose various sulphur combusting technologies, systems and methods. The methods generally entail steps of evaporating liquid sulphur to generate sulphur dioxide gas and sulphur vapour, combusting the sulphur vapour with oxygen to generate heat, and reducing the sulphur dioxide (either at high temperature or catalytically) to carbon dioxide and sulphur vapour by reacting the sulphur dioxide with carbonyl sulphide.

In U.S. Pat. No. 7,631,499 the combustion system is a multiple-stage combustion system comprising a series of successive (sequentially arranged) combustors that burn sulphur vapour at a desired temperature such that, at each successive stage, the combustion of the sulphur is burnt with a stoichiometric deficiency of oxygen. In one embodiment, the multiple-stage combustion system may be an axially staged combustion system for a gas turbine engine. The multi-stage combustion system can be used to burn sulphur in stages.

U.S. Pat. No. 4,107,557 discloses an MHD generator system that comprises a burning chamber in which sulfur is burned with oxygen at a temperature upwards of 8000 F. with an additive of a readily ionizable seed material to form a partially ionized stream of $SO_2$ and seed material.

Stanley et al., in U.S. Pat. No. 4,354,354, disclosed a method in which the seed, in form of potassium sulphate ($K_2SO_4$) is fed into an MHD combustor, mechanically recovered and recycled without need for regeneration.

A method and apparatus for combine-closed-cycle magneto-hydrodynamic generation is disclosed by Shiota et. al., in U.S. Pat. No. 5,086,234.

Figure 4:
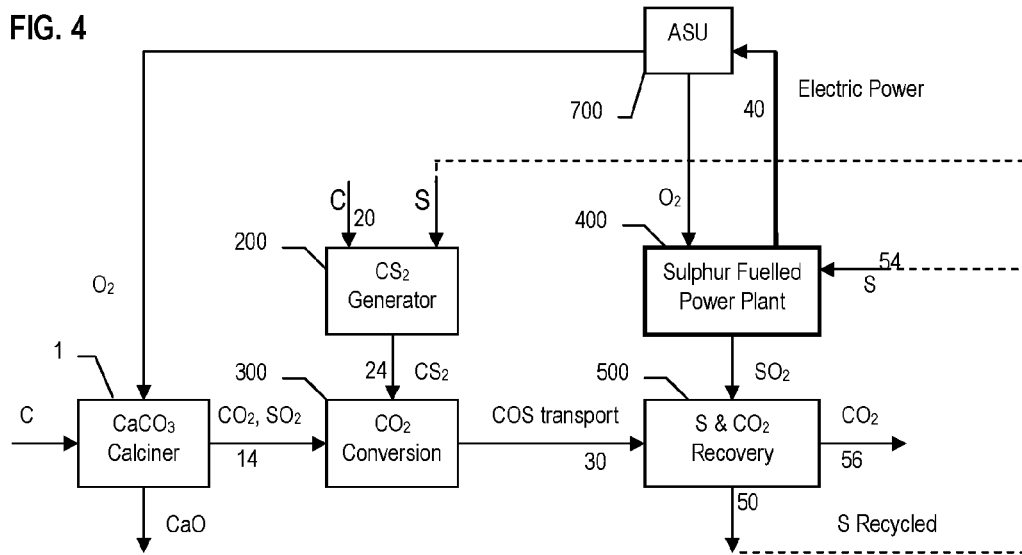
FIG. 4 schematically depicts a standalone sulphur-fueled power generation plant adapted to accept CO$_2$ from a limestone calcination-cement production plant in accordance with another embodiment of the present invention.

FIG. 4 depicts a system that comprises a $CaCO_3$ calciner 1 that receives carbon and oxygen and produces CaO and $CO_2$. The calciner 1 may be part of a cement production plant for manufacturing cement clinker from limestone ($CaCO_3$). In most embodiments, the cement production plant includes a preheater for preheating the limestone, a calciner for calcination, and a rotary kiln for high-temperature burning at about 1450° C. to make the clinker that is then ground or milled into powder form with a small quantity of gypsum to make 'Ordinary Portland Cement' (OPC). In this calcination process of heating limestone (calcium carbonate) with small quantities of other materials (such as clay) to 1450 ° C. in a kiln, carbon dioxide is produced. The carbon dioxide from the cement plant may be captured using the CCS technologies described herein, namely by converting the carbon dioxide to COS, transporting the COS to a sulphur-recovery site where sulphur is recovered from the COS and then combusted. Carbon dioxide that reforms when the sulphur is recovered may then be sequestered at a suitable sequestration site. Energy harnessed from the combustion of sulphur may then be used to power one or more of the CCS processes such as injection of carbon dioxide into underground formations or saline aquifers. The energy harnessed from the combustion of sulphur may also be used to supply power to the cement manufacturing plant.

As further illustrated in FIG. 4, the carbon dioxide from the calciner is supplied to a COS converter 300 (labelled "$CO_2$ converter" in the figure). The converter 300 receives the carbon dioxide from the calciner 1 and receives the $CS_2$ from a $CS_2$ generator 200 and converts the carbon dioxide into COS for transport via pipeline (or other transport means) 30 to a sulphur dioxide reducer ("$SO_2$ reduction unit" or "S & $CO_2$ recovery unit") 500 that receives sulphur dioxide from a sulphur-fuelled power plant 400 (sulphur-burning plant). The $SO_2$ reduction unit 500 provides sulphur to a $CS_2$ generator 200 (that, in turn, supplies the $CS_2$ to the COS converter ("$CO_2$ converter" 300). As illustrated in this embodiment, the $SO_2$ reduction unit (S & $CO_2$ recovery unit) 500 provides sulphur to the sulphur-burning plant 400. The sulphur-burning plant 400 (sulphur combustor) generates power (e.g. electric power) which is delivered to the air-separation unit (ASU) 700 for separating the oxygen from the air. The oxygen is fed into the calciner 1 and also into the sulphur combustor of the sulphur-fuelled plant 400 as shown in FIG. 4. The waste sulphur dioxide from the sulphur combustion at the sulphur-burning plant 400 is fed into, and reduced by, the reduction unit 500 so this process does not emit any sulphur dioxide. The carbon dioxide from the reduction unit 500 may be sequestered in a suitable sequestration site.

The present invention may thus be utilized for carbon capture in a variety of different applications including any hydrocarbon or fossil fuel combustion process (e.g. burning coal, natural gas or petroleum) that produces carbon dioxide. This invention may also be used to capture carbon in a cement cement production process that produces carbon dioxide as a byproduct. This invention may thus be understood more broadly as a carbon capture technology for capturing anthropogenic carbon dioxide (i.e. carbon dioxide that is produced by power-generating stations, industrial processes or other manmade sources).

Figure 5:
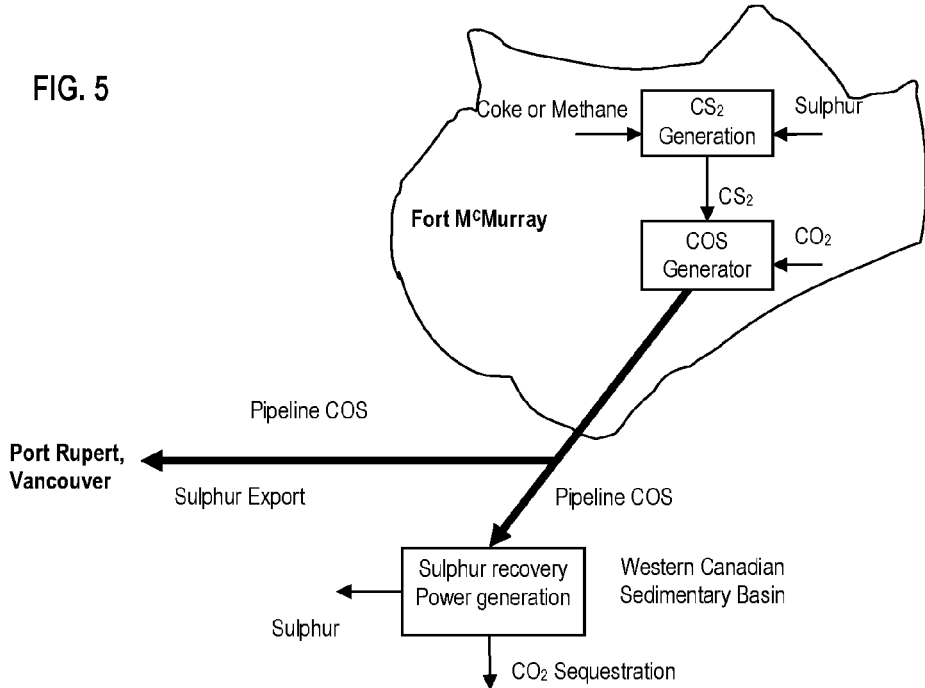
FIG. 5 schematically depicts a process of transporting CO$_2$ and sulphur from an oil sands exploration site.

FIG. 5 depicts a system that comprises a $CS_2$ generator that receives coke or methane as well as sulphur to generate $CS_2$ which is then supplied to a COS generator. The COS generator receives carbon dioxide from a combustor (hydrocarbon combustion process such as the combustion of coke). The COS in liquid form is then shipped via pipeline (or other transport means) to a sulphur recovery and power generation plant where elemental sulphur is recovered and burned to generate power and where carbon dioxide is sequestered. As shown in this figure, other COS may be sent to a port for export abroad (transhipment via a seaport). The system of FIG. 5 may be particularly useful, for example, in Western Canada. The COS generator may be disposed at an oil sands exploitation site such as the oil sands at Fort McMurray, Canada. COS may then be sent via pipeline and shipped abroad via Port Rupert on the Canadian Pacific coast while carbon dioxide may be sequestered in the Western Canadian Sedimentary Basin. This figure shows how the system may be applied to a real-world scenario. Clearly, this is merely an illustrative example and the system may of course be applied to any other comparable scenario.

Figure 6:
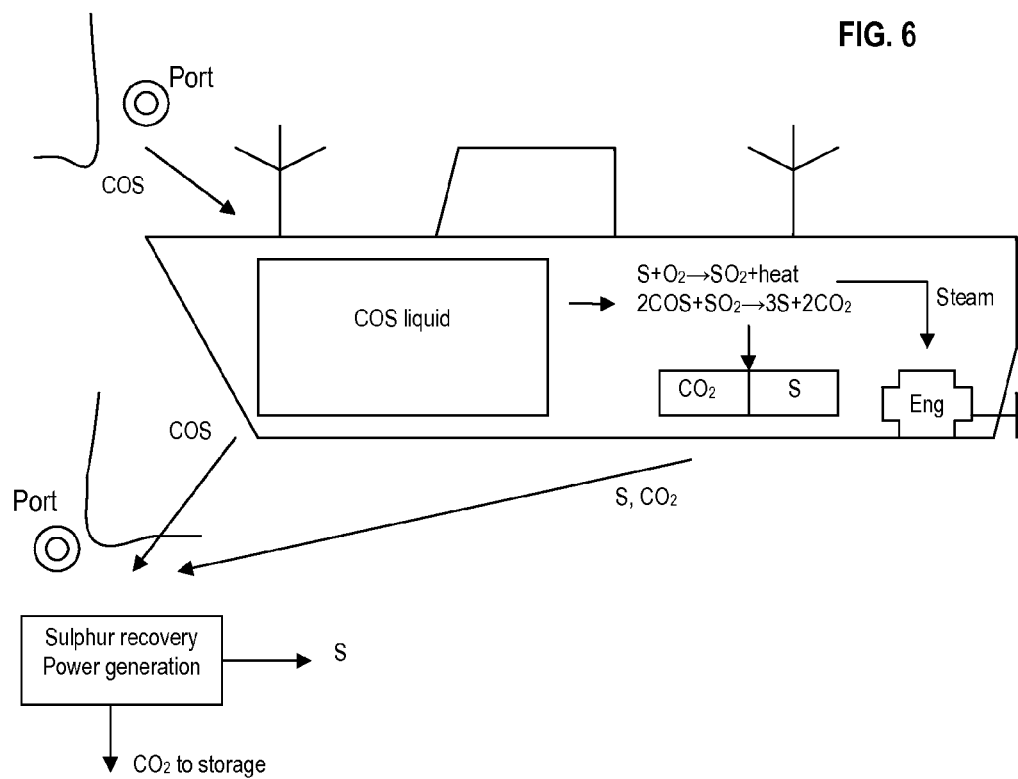
FIG. 6 schematically depicts a COS transportation vessel having a sulphur-burning engine.

FIG. 6 depicts a sulphur-powered vehicle, in this case a seagoing vessel or ship that is fully or partially powered by the combustion of sulphur. The ship in this case is a tanker or freighter capable of carrying COS. One or more COS liquid container(s) is provided as shown. Some of the COS may be drawn from the container(s) and converted into sulphur and carbon dioxide. The carbon dioxide is stored on the ship in a carbon dioxide containment vessel. The sulphur may be combusted to provide heat energy which can be harnessed to drive a ship turbine as part of the ship's engine. The ship of FIG. 6 thus has a sulphur-combustion engine that draws on the onboard COS supply for its fuel. Although a ship is illustrated in FIG. 6, it should be understood that this concept may be applied to other vehicles, including trains (in which the locomotive has a sulphur-combusting engine) or to other land vehicles having a sulphur-combusting engine.

This invention has been described in terms of specific embodiments, implementations and configurations which are intended to be exemplary only. Persons of ordinary skill in the art will appreciate, having read this disclosure, which many obvious variations, modifications and refinements may be made without departing from the inventive concept(s) presented herein. The scope of the exclusive right sought by the Applicant(s) is therefore intended to be limited solely by the appended claims.

The invention claimed is:

1. A method for carbon capture and storage, the method comprising
    combusting a hydrocarbon with pure oxygen in a combustor to produce heat energy and carbon dioxide;
    supplying $CS_2$ from a $CS_2$ generator;
    converting the carbon dioxide to COS by reacting the carbon dioxide with the $CS_2$ supplied from the $CS_2$ generator;
    transporting the COS to a $CO_2$ sequestration site;
    recovering sulphur from the COS by a $SO_2$ reduction unit disposed at the $CO_2$ sequestration site while also recovering carbon dioxide from the COS and sequestering the carbon dioxide in the $CO_2$ sequestration site;
    combusting the sulphur in a sulphur-burning power plant at the $CO_2$ sequestration site;
    extracting energy from the combusting of the sulphur;
    using the energy generated by the sulphur-burning power plant for powering one or more carbon capture and storage processes that perform the sequestering of the carbon dioxide in the $CO_2$ sequestration site; and
    electrolyzing water using part of the energy obtained from the sulphur-burning power plant.

2. The method as claimed in claim 1 wherein combusting the sulphur comprises combusting a portion of the sulphur recovered from the COS while supplying a remainder of the sulphur to the $CS_2$ generator.

3. The method as claimed in claim 2 wherein the sulphur-burning power plant supplies power to a carbon dioxide compressor for pressurizing carbon dioxide for injection into the sequestration site.

4. The method as claimed in claim 2 wherein the sulphur-burning power plant supplies power to an air separation unit that supplies the pure oxygen to the oxy-fuel combustor.

5. The method as claimed in claim 1 wherein combusting the hydrocarbon with pure oxygen is performed by an oxy-fuel combustor.

6. The method as claimed in claim 1 wherein electrolyzing the water produces oxygen that is supplied to the oxy-fuel combustor.

7. The method as claimed in claim 1 wherein electrolyzing the water produces hydrogen that is supplied to a hydrogen-fueled power plant.

8. The method as claimed in claim 1 wherein transporting the COS is performed by pipeline.

9. The method as claimed in claim 1 wherein transporting the COS is performed by ship.

* * * * *